(12) United States Patent
White, Jr. et al.

(10) Patent No.: US 6,245,170 B1
(45) Date of Patent: *Jun. 12, 2001

(54) BELT CONSTRUCTION AND METHOD OF MAKING THE SAME

(75) Inventors: Jack D. White, Jr., Springfield, MO (US); Douglas W. Sides, Aiken, SC (US)

(73) Assignee: Dayco Products, Inc., Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/212,335

(22) Filed: Dec. 15, 1998

Related U.S. Application Data

(63) Continuation-in-part of application No. 08/823,922, filed on Mar. 25, 1997, now abandoned, which is a continuation of application No. 08/329,589, filed on Oct. 26, 1994, now Pat. No. 5,643,378.

(51) Int. Cl.⁷ .............................. B29D 29/00; F16G 5/08
(52) U.S. Cl. ...................... 156/87; 156/137; 156/141; 156/142
(58) Field of Search ............................. 156/87, 137, 138, 156/139, 140, 141, 142, 130.3; 474/260, 261, 262, 264, 266, 268, 265

(56) References Cited

U.S. PATENT DOCUMENTS

| | | | |
|---|---|---|---|
| 2,361,645 | * 10/1944 | Nassimbene | 474/265 |
| 3,914,501 | * 10/1975 | Miller et al. | |
| 3,951,719 | * 4/1976 | Hough | 156/130.3 |
| 4,226,069 | * 10/1980 | Hinds | |
| 4,299,588 | * 11/1981 | Standley | 156/137 |
| 4,432,744 | * 2/1984 | Imamura et al. | 474/262 |
| 4,434,019 | 2/1984 | Hollaway, Jr. | 156/137 |
| 4,744,843 | * 5/1988 | Lewis | 156/87 |
| 4,997,611 | * 3/1991 | Hartmann | |
| 5,030,497 | * 7/1991 | Claessen | |
| 5,431,986 | * 7/1995 | Ortega et al. | |
| 5,589,258 | * 12/1996 | Maddern et al. | |
| 5,643,378 | * 7/1997 | White et al. | 156/87 |

FOREIGN PATENT DOCUMENTS 1-239251 * 9/1989 (JP) ....................... 156/87

OTHER PUBLICATIONS

"Finishing Spunbondeds", America's Textiles Reporter/Bulletin, Clark Publishing Company, pp. 40 and 42, Apr. 1972.*
Flo-Tech Incorporated Product sheet for HTP 1.5, No date.*
Wingate, Fairchild's Dictionary of Textiles, p. 417, 1979.*
Kirk Othmer, Encyclopedia of Chemical Technology, pp. 72–104, 1981.*

* cited by examiner

*Primary Examiner*—Steven D. Maki
(74) *Attorney, Agent, or Firm*—Joseph V. Tassone

(57) ABSTRACT

An endless belt construction and method of making the same are provided, the endless belt construction being formed mainly of polymeric material and comprising a tension section, a compression section, a load carrying section disposed between the tension section and the compression section and being secured thereto, one of the sections comprising a plurality of layers of polymeric material disposed in stacked relation, and a paper-thin sheet of nonwoven material disposed between an adjacent pair of the layers of polymeric material and being secured thereto during heat curing of the belt construction, wherein the thin sheet bleeds gaseous matter trapped between the adjacent pair of layers during the heat curing.

10 Claims, 1 Drawing Sheet

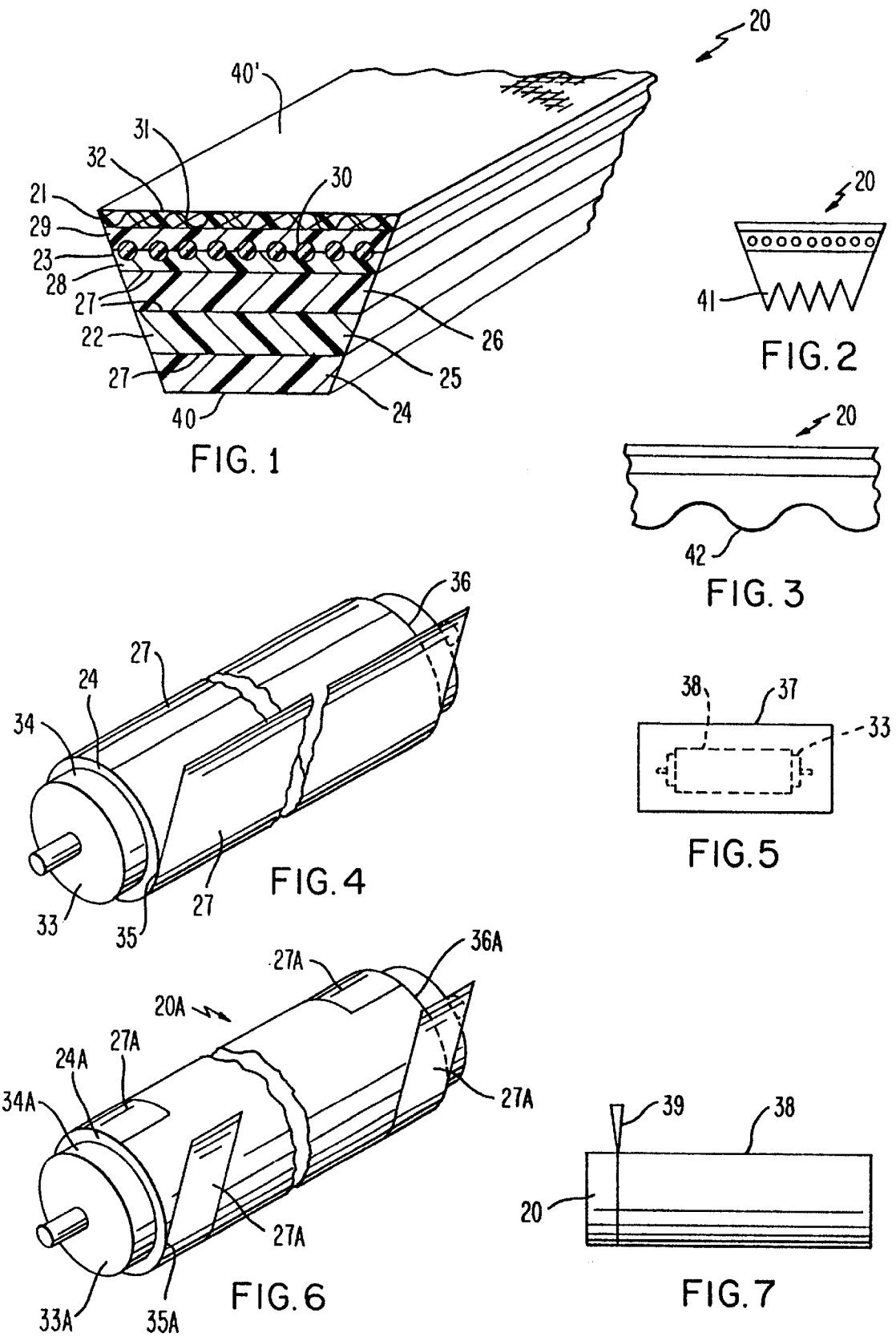

BELT CONSTRUCTION AND METHOD OF MAKING THE SAME

This application is a continuation-in-part of application Ser. No. 08/823,922, filed Mar. 25, 1997, now abandoned, which is a continuation of application Ser. No. 08/329,589 filed Oct. 26, 1994, now U.S. Pat. No. 5,643,378.

BACKGROUND OF THE INVENTION

1. Field of the Invention

This invention relates to a new endless belt construction and to a new method of making such a new endless belt construction.

2. Prior Art Statement

It is known to provide an endless belt construction formed mainly of polymeric material and comprising a tension section, a compression section, a load carrying section disposed between the tension section and the compression section and being secured thereto, one of the sections comprising a plurality of layers of polymeric material disposed in stacked relation, and a plurality of bleeder yarns disposed between an adjacent pair of the layers of polymeric material and being secured thereto to serve as fluid passages for any fluid present at the interface between the adjacent pair of layers of polymeric material during the heat curing of the belt construction. For example, see the U.S. Pat. No. to Hollaway, Jr., 4,434,019.

SUMMARY OF THE INVENTION

It is one of the features of this invention to provide a new method of making a belt construction wherein trapped air and/or gases that are formed between adjacent polymeric layers of the belt construction during the heat curing of the belt construction are bled to the exterior thereof.

In particular, it was found according to the teachings of this invention that a relatively thin non-woven sheet of material can be disposed between the adjacent layers of the belt construction to subsequently bleed the trapped air and/or gases that are encountered during the subsequent heat curing operation.

For example, one embodiment of this invention provides a method of making an endless belt construction formed mainly of polymeric material and comprising a tension section, a compression section, a load carrying section disposed between the tension section and the compression section and being secured thereto by the step of heat curing the belt construction, one of the sections comprising a plurality of layers of polymeric material disposed in stacked relation, the method comprising the step of disposing a paper-thin sheet of non-woven material between an adjacent pair of the layers of the polymeric material before the step of heat curing so that the sheet is secured to the adjacent pair of the layers during the step of heat curing the belt construction.

Accordingly, it is an object of this invention to provide a new method of making an endless belt construction, the method of this invention having one or more of the novel features of this invention as set forth above or hereinafter shown or described.

Another object of this invention is to provide a new endless belt construction having one or more of the novel features of this invention as set forth above or hereinafter shown or described.

BRIEF DESCRIPTION OF THE DRAWINGS

The features of the invention, and its technical advantages, can be seen from the following description of the preferred embodiments together with the claims and the accompanying drawings, in which:

FIG. 1 is a fragmentary perspective view that is partially in cross section and illustrates the new belt construction of this invention;

FIG. 2 is a reduced end view of another new belt construction of this invention;

FIG. 3 is a reduced fragmentary side view of another new belt construction of this invention;

FIG. 4 is a schematic perspective view illustrating how the layers of the belt construction of FIG. 1 can be formed on a drum to be subsequently heat cured;

FIG. 5 is a schematic view illustrating the belt construction and drum of FIG. 4 being heat cured in a heat curing chamber;

FIG. 6 is a view similar to FIG. 4 and illustrates another method of this invention for forming another belt construction of this invention; and FIG. 7 is a schematic view illustrating how individual belts can be formed from the belt sleeve that is formed in the manner illustrated in FIG. 4 or FIG. 6.

DESCRIPTION OF PREFERRED EMBODIMENTS

While the various features of this invention are hereinafter illustrated and described as providing belt constructions of particular configurations, it is to be understood that the various features of this invention can be utilized singly or in any combination thereof to provide a belt construction having any other configuration as desired.

Therefore, this invention is not to be limited to only the embodiments illustrated in the drawings, because the drawings are merely utilized to illustrate one of the wide variety of uses of this invention.

Referring now to FIG. 1, the new endless belt construction of this invention is generally indicated by the reference numeral 20 and is formed mainly of polymeric material as will be apparent hereinafter, the belt construction 20 comprising a tension section 21, a compression section 22, and a load carrying section 23 disposed between the tension section 21 and the compression section 22 and being secured thereto during a subsequent heat curing operation in a manner well known in the art. For example, see the aforementioned U.S. Pat. No. to Hollaway, Jr., 4,434,019, whereby this U.S. patent is being incorporated into this disclosure by this reference thereto.

The compression section 22 of the belt construction 20 is formed from a plurality of polymeric layers 24, 25 and 26 disposed in stacked relation and uniquely having paper-like, namely paper-thin, sheets 27 of non-woven material disposed therebetween as well as a like sheet 27 disposed between the polymeric layer 26 of the compression section 22 and the load-carrying section 23 for a purpose hereinafter set forth.

While FIG. 1 illustrates the sheets 27 by a single line, it is to be understood that the sheets 27 of this invention are so thin and open that the same are actually substantially non-detectable to the eye in the finished belt construction 20.

Nevertheless, the sheets 27 of this invention are adapted to bleed trapped air and/or gases which are typically encountered from plying up the layers 24, 25, 26 and 23 of smooth "tacky" materials and may provide reinforcement to the compression section 22, such as by providing a crack barrier therefor.

The load carrying section 23 of the belt construction 20 comprises a lower layer or cushion 28 of polymeric material and an upper layer or cushion 29 of polymeric material with a load carrying cord 30 of polymeric material having been helically wound on the cushion 28 before the cushion 29 is disposed thereon in a manner well known in the art.

The tension section 21 comprises a woven fabric 31 that has been treated with polymeric material to comprise a layer 32 as illustrated in FIG. 1 which is disposed against the top cushion 29 also in a manner well known in the art.

The endless belt construction 20 is formed by forming an endless belt sleeve on a cylindrical drum or mandrel 33 as illustrated in FIG. 4 which is formed of any suitable material, such as metallic material, and having an outer peripheral surface 34 against which the first layer 24 of material is disposed or wrapped in a conventional manner. Thereafter, the first paper-thin sheet 27 of material is disposed or wrapped on the layer 24 so as to extend from one side edge means 35 of the layer 24 to the opposite edge means 36 thereof so as to be continuous throughout the entire width of the layer 24 on the drum 33. The layers 25, 26 and 28 are likewise disposed or wrapped on the mandrel 33 in stacked relation therewith with the sheets 27 being disposed therebetween and extending completely across the width of the layers 25, 26 and 28. Thereafter, the cord 30 is helically wound on the cushion 28 and then the cushion 29 is disposed on the same. Subsequently, the tension layer 32 is disposed on the outer cushion 29 and the mandrel 33 together with the material built thereon in the manner previously described are disposed in a chamber means 37 as illustrated in FIG. 5 wherein the material is subjected to heat and pressure in a conventional manner to heat cure the belt construction 20, which is subsequently removed from the chamber means 37 and cooled to form the belt sleeve 38 illustrated in FIG. 7, wherein individual endless belts 20 are cut therefrom by a suitable cutter means 39 all in a manner well known in the art.

As previously stated, during the heat curing operation on the belt sleeve 38, it has been found that the sheets 27 bleed trapped air and/or gases from the interior of the belt construction 20 to the exterior thereof at the side edge means 35 and 36 while being completely bonded in between the respective layers 24, 25, 26 and 28 during such heat curing operation.

However, it has also been found according to the teachings of this invention that the sheets 27 need not extend completely from one end edge to the opposite end edge of the belt sleeve but can merely be separate narrow sheets disposed adjacent the end edges of the belt sleeve.

For example, reference is now made to FIG. 6 wherein another belt construction of this invention is generally indicated by the reference numeral 20A and parts thereof similar to the belt construction 20 of FIG. 4 are indicated by like reference numerals followed by the reference letter "A".

As illustrated in FIG. 6, the layer 24A is first disposed or wrapped on the external peripheral surface 34A of the building drum 33A and then two narrow paper-thin sheets 27A of non-woven material are disposed on the layer 24A so that the sheets 27A respectively extend to the respective adjacent side edge means 35A or 36A of the layer 24A while leaving the medial portion of the layer 24A uncovered as illustrated in FIG. 6.

Thereafter, the additional layers to form the belt construction 20A are built up on the drum 33A in the manner previously described except that the sheets 27A do not cover the medial portions of the various layers as it has been found that during the subsequent heat curing operation, the pressure on the medial portion of the resulting belt sleeve 38A is sufficient to force the air and/or gases in the medial portions toward the outer edge means 35A and 36A whereas the sheets 27A perform the function of bleeding the air and/or gases at the outer portions of the belt construction 38A to the side edge means 35A and 36A in the manner previously set forth.

While the belt construction 20 of this invention illustrated in FIG. 1 has a substantially straight inner surface 40, so as to be a conventional "V" belt, the same could be shaped in any desired manner.

For example, the inner surface 40 of the belt construction 20 could be subsequently longitudinally ground or cut to define a plurality of longitudinal ribs 41 as illustrated in FIG. 2 or the external peripheral surface 34 of the building drum 33 could be corrugated as in the aforementioned U.S. Pat. No. to Hollaway, 4,434,019, so as to define a plurality of transverse teeth 42 in the manner illustrated in FIG. 3.

In any event, the sheets 27 or 27A perform their bleed function and the resulting belts 20 formed from such belt sleeves 38 or 38A that have the material of the sheets 27 or 27A remaining therein may result in increased reinforcement of the particular parts of the resulting belt 20 where such sheets 27 or 27A are located.

Further, while the belt construction 20 has the sheets 27 disposed in the compression section 22 and between the compression section 22 and the load carrying section 23 as previously described, it is to be understood that the load carrying section 23 and/or tension section 21 could comprise a plurality of layers wherein a sheet 27 or 27A is disposed between adjacent layers as desired.

While it is believed that the various layers of the belt construction 20 of this invention can be formed from any suitable polymeric material and be of any suitable thickness, one working embodiment of a belt construction 20 that contains the sheets 27 in the manner illustrated in FIG. 1 comprises a belt construction that has an outside circumference of approximately 121.92 cm (48 inches) and a belt thickness of approximately 0.457 cm (0.180 of an inch) between the bottom surface 40 and the top surface 40' thereof.

The layers 24, 25 and 26 of the compression section 2 comprise chloroprene with randomly disposed fiber reinforcement therein, with each layer 24, 25 and 26 being approximately 0.102 cm (0.040 of an inch) thick before the heat curing thereof. The paper-thin sheets 27 each comprises a non-woven sheet of polypropylene of approximately 0.170 kg/m² (5 ounces per square yard) thereof and being approximately 0.008 cm (0.003 of an inch) thick before the heat curing thereof, such sheets 27 each having a light yellow or golden hue or even being white and still being substantially nondetectable in the finished belt construction 20. Such a non-woven sheet 27 is sold by the Flowtech Company of Plymouth, Mich.

The cushions 28 and 29 of the belt construction 20 each comprises a chloroprene gum stock layer that is approximately 0.051 cm (0.020 of an inch) thick before the heat curing thereof and the cord 30 comprises a polyester cord of approximately 0.104 cm (0.041 of an inch) in diameter before the heat curing thereof.

The tension section 21 is formed from a fabric treated with chloroprene in a manner well known in the art and is approximately 0.056 cm (0.022 of an inch) thick before the heat curing operation.

Thus, it can be seen that this invention not only provides a new endless belt construction but also this invention provides a new method of making such an endless belt construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making an endless belt construction formed mainly of polymeric material and comprising a tension section, a compression section, and a load carrying section disposed between said tension section and said compression section and being secured thereto by a step of heat curing said belt construction, one of said sections comprising a plurality of layers of polymeric material disposed in stacked relation, the improvement comprising the step of disposing a thin sheet of non-woven material between an adjacent pair of said layers of polymeric material before the step of heat curing so that said sheet is secured to each layer of said adjacent pair of said layers during the step of heat curing said belt construction, said thin sheet bleeding gaseous matter trapped between said adjacent pair of layers during the heat curing step.

2. A method of making a belt construction as set forth in claim 1 wherein said belt construction comprises an endless belt sleeve and comprising the step of cutting individual endless belts from said sleeve.

3. A method of making a belt construction as set forth in claim 1 and comprising the step of building said belt construction on a drum.

4. A method of making a belt construction as set forth in claim 1 and comprising the step of forming said sheet from polymeric material.

5. A method of making a belt construction as set forth in claim 1 and comprising the step of forming said load carrying section to comprise one layer of said pair of adjacent layers.

6. A method of making a belt construction as set forth in claim 5 and comprising the step of forming said compression section to comprise the other layer of said pair of adjacent layers.

7. A method of making a belt construction as set forth in claim 1 and comprising the steps of forming said one section to comprise said compression section, forming said plurality of layers to comprise at least three layers two of which comprise said pair of layers, and disposing a second sheet of said non-woven material between another adjacent pair of said layers so as to be secured therebetween during the step of heat curing said belt construction.

8. A method of making a belt construction as set forth in claim 1 wherein said belt construction has opposite side edges, and wherein the step of disposing said sheet causes said sheet to extend from one of said side edges to the other of said side edges.

9. A method of making a belt construction as set forth in claim 1, wherein said thin sheet of non-woven material has a thickness of approximately 0.003 of an inch before the step of heat curing.

10. A method of making a belt construction as set forth in claim 1, wherein said belt construction has opposite side edges, wherein the step of disposing of said sheet causes said sheet to extend from one of said side edges to a point that is spaced inwardly from the other of said side edges, and comprising the step of disposing a further thin sheet between said adjacent pair of said layers of polymeric material such that said further sheet extends from the other of said side edges to a point that is spaced from said first mentioned sheet.

* * * * *